May 20, 1969 R. R. DE GRAFF 3,445,378
SEPARATION PROCESS
Filed Oct. 11, 1967
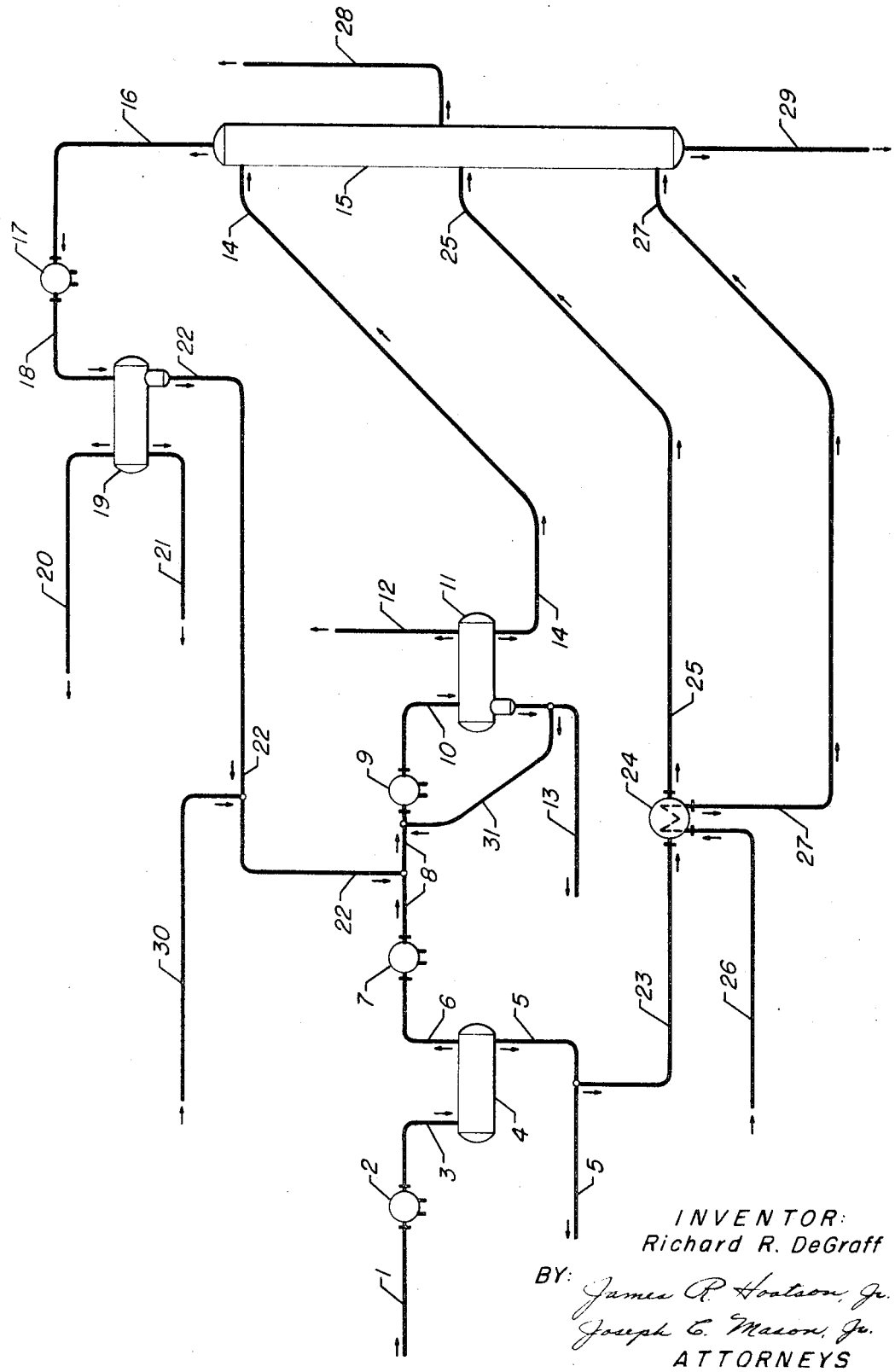
INVENTOR:
Richard R. DeGraff
BY:
James R. Hoatson, Jr.
Joseph C. Mason, Jr.
ATTORNEYS 3,445,378
SEPARATION PROCESS
Richard R. De Graff, Arlington Heights, Ill., assignor to Universal Oil Products Company, Des Plaines, Ill., a corporation of Delaware
Filed Oct. 11, 1967, Ser. No. 674,497
Int. Cl. B01d 3/38; C10g 39/00, 37/00
U.S. Cl. 208—104                 10 Claims

ABSTRACT OF THE DISCLOSURE

Separation process wherein a reactor effluent containing vapor, liquid, and normally gaseous contaminants is separated in a system comprising a hot phase separator, two cold phase separators, and a steam stripping column. The process has particular application to the separation of the typical reactor effluent from a hydrotreating reaction zone or a hydrocracking reaction zone wherein the reactor effluent comprises hydrogen, hydrocarbon vapor, hydrocarbon liquid, hydrogen sulfide, and ammonia.

Field of the invention

The present invention relates to a product separation process and especially to a mixed-phase product separation process. The invention described herein particularly relates to the separation of a reactor effluent containing hydrogen, hydrocarbon, and normally gaseous contaminants. It more particularly relates to the separation of an effluent from a hydrotreating or a hydrocracking reaction zone. The invention specifically relates to the separation of a reactor effluent which is contaminated with ammonia and hydrogen sulfide, in order to produce a hydrocarbon product having substantial freedom from such normally gaseous contaminants.

The mixed-phase separation process, hereinafter described in detail, is typically applicable to a hydrocarbon conversion process which may be classified as a hydrogen consuming process in which processing techniques dictate the recycle of hydrogen-rich gaseous phase and in many instances the recycle of at least a portion of the normally liquid fraction of the reaction zone effluent. Such hydrogen consuming processes include the hydrorefining or hydrotreating processes wherein gasoline or naphtha fractions, kerosene fractions, middle-distillate fractions, light and heavy vacuum gas oils, light and heavy cycle stocks, etc. are treated with hydrogen for the primary purpose of reducing the concentration of various chemical contaminants contained therein. Another typical hydrogen consuming hydrocarbon conversion process is known in the petroleum refining art as hydrocracking, which may be defined more particularly as the destructive hydrogenation of petroleum. Basically, hydrocracking techniques are utilized to convert relatively heavy hydrocarbonaceous material into lower boiling hydrocarbon products such as gasoline, fuel oil, light cycle oils, etc. In other instances the desired end result of hydrocracking is the production of liquefied petroleum gas. Relatively recent developments in the area of petroleum technology have indicated that the hydrocracking reactions can also be applied successfully to residual stocks, or so called "black oils." Typical examples of hydrocarbons classified as black oils are atmospheric tower bottoms products, vacuum tower bottoms (vacuum residuum), crude oil residuum, topped crude oils, crude oils extracted from tar sands, etc. Although any of the many hydrocarbon effluents resulting from feed stocks disclosed above may be separated within the scope of the present invention, as hereinafter indicated by specific example and by the embodiment presented herein, the utilization of the inventive reactor effluent separation process particularly achieves unusual advantages in a process effecting the conversion of black oils to lower boiling hydrocarbons.

Hydrogen treatment of contaminated hydrocarbon charge stocks is well-known in the art of hydrocarbon processing, and a typical method is shown in U.S. Letters Patent No. 2,878,180. Hydrogen treatment, or hydrotreating, saturates the olefinic constituents of the stock and removes sulfur, nitrogen, chlorine, and other inorganic contaminants of hydrogenation. Hydrotreating also serves to remove trace quantities of arsenic, lead, copper, nickel, vanadium, tungsten, and other metals which may be present in untreated hydrocarbon fractions and which may be detrimental in subsequent processing operations or in final product use. The purification is effected by passing the hydrocarbon charge in admixture with hydrogen into the presence of a suitable catalyst at a pressure of from about 100 p.s.i.g. to about 1500 p.s.i.g., the operating pressure being dependent upon the composition or type of charge stock being processed. The hydrogen not only serves as a reactant in effecting the purification of the hydrocarbons but it also affords a method for protecting the catalyst against excessive carbonization by providing a thermal sink for the exothermic heat of reaction. Hydrogen is, therefore, normally present at a concentration of from about 100 standard cubic feet per barrel (s.c.f.b.) of hydrocarbon charge to about 3000 s.c.f.b., the amount again being dependent upon the type of charge stock being processed. The temperature of the hydrogen treating zone is maintained in the range from about 350° F. to about 900° F. The actual temperature required will necessarily vary in accordance with the degree of contamination, the type of stock being processed, and with the activity level of the catalyst. The hydrocarbon is normally processed at a liquid hourly space velocity in the range of from about 1.0 to about 10.0. A suitable catalyst for such hydrogen treating of hydrocarbons comprises alumina, silica, and a Group VIII metal or a Group VI–B metal or any combination of metals thereof. The metals of Groups VI–B and VIII are intended to include those indicated in the Periodic Chart of the Elements, Fisher Scientific Company, 1953. A preferred hydrotreating catalyst is comprised of alumina, silica, nickel, molybdenum, and cobalt wherein the metals may be specifically present as the oxides or sulfides.

Hydrocracking is also commonly referred to as destructive hydrogenation and is thereby distinguished from hydrotreating. In hydrotreating there is simple addition of hydrogen to unsaturated bonds between the carbon atoms and simple substitution of hydrogen for inorganic atoms bonded to the carbon atoms. Hydrocracking effects a more definite change in the molecular structure of the hydrocarbons being processed, however, in that it breaks carbon-to-carbon bonds in the molecules of the hydrocarbon charge to produce lower boiling products. Hydrocracking processes are most commonly employed for the conversion of various hydrocarbon products boiling above the gasoline or naphtha boiling range, for the primary purpose of producing substantial yields of lower boiling saturated products. Although many hydrocracking reactions may be conducted on a thermal basis, the preferred processing techniques involves utilization of a catalytic composite possessing a very high degree of hydrocracking activity. In virtually all hydrocracking processes, whether thermal or catalytic, controlled or selected cracking is highly desirable from the standpoint of producing increasing yields of liquid products boiling within the desired boiling ranges.

Selective hydrocracking is of particular importance when processing hydrocarbons and mixtures of hydrocarbons which boil at temperatures above the gasoline and the middle-distillate boiling range, that is, hydrocarbons and mixtures of hydrocarbons having a boiling range indicating an initial boiling point greater than 400° F. and an end boiling point as high as 1000° F. or more. Recent developments in hydrocracking technology have now indicated that the hydrocracking of residual oils or black oils having substantial quantities of hydrocarbonaceous material boiling at about 1200° F. or more may be undertaken. Selective hydrocracking of such hydrocarbon fractions results in greater yields of hydrocarbons boiling within the gasoline and middle-distillate boiling range, that is, hydrocarbons boiling below a temperature of 650° F. to 700° F. The practice of the present invention has particularly significant application to the selective hydrocracking of such heavy hydrocarbon stocks.

The hydrocracking of hydrocarbon charge stocks not only provides cracking of high molecular weight materials but it also saturates olefinic constituents of the stock and removes sulfur, nitrogen, chlorine, and other inorganic contaminants by hydrogenation. The hydrocracking reaction thus, also serves to remove trace quantities of arsenic, lead, copper, nickel, vanadium, tungsten, and other metals which may be present in the hydrocarbon fractions.

The hydrocracking reaction is effected by passing the hydrocarbon charge in admixture with hydrogen in the presence of a suitable catalyst at a pressure of from about 100 p.s.i.g. to about 3000 p.s.i.g. or more, the operating pressure being dependent upon the composition or type of charge-stock being processed and the catalyst being utilized. The hydrogen not only serves as reactant in effecting the cracking and the purification of the hydrocarbon, but again affords a method for protecting the catalyst against excessive carbonization. Hydrogen is, therefore, normally present at a concentration from about 100 s.c.f.b. of hydrocarbon charge to about 20,000 s.c.f.b., the amount again being dependent upon the type of charge stock being processed. The temperature of the hydrocracking reaction zone is maintained in the range of about 500° to 1000° F. or more. The actual temperature required will necessarily vary in accordance with the degree of contamination of the stock, the boiling range of the stock, the activity level of the catalyst, and the type of ultimate products which it is desired to produce. The hydrocarbon is normally processed at a liquid hourly space velocity in the range of from about 0.5 to about 10. A typical catalyst for such hydrocracking of hydrocarbons comprises alumina, silica, and a Group VIII metal or a Group VI-B metal or any combination of metals thereof.

DESCRIPTION OF PRIOR ART

As known by those skilled in the art, the effluent mixture from the hydrotreating or hydrocracking reaction zone will leave at elevated temperature and elevated pressure and will contain normally gaseous contaminants, typically comprising hydrogen sulfide, ammonia, and hydrogen chloride. Upon subsequent cooling in an effluent exchanger these contaminants may deposit in the exchanger and causes reduced heat transfer rates and excessive pressure drop. The major constituents of such deposits are ammonium chloride, and ammonium polysulfides, and it is, therefore, common in the prior art to inject steam condensate into the effluent mixture ahead of the exchanger in order to afford a method of washing such deposits out of the exchanger. The condensate injection rate is preferably equivalent to at least 3 vol. percent of the total liquid hydrocarbon which is charged to the reaction zone. This rate not only provides more than a sufficient quantity of water to dissolve the hydrocarbon insoluble constituents, but it particularly assures that there will be intimate mixing of the hydrocarbon and water to assure that the water soluble salts will readily pass into solution. In addition, the turbulence provided by the resulting aqueous phase assists in washing out any other surface deposits.

The cooled effluent then passes, typically, into a high pressure separator wherein a hydrogen-containing vapor phase, a liquid hydrocarbon phase, and an aqueous phase are maintained at the pressure of the reaction system. The aqueous phase containing the dissolved inorganic contaminants is discarded while at least a part of the hydrogen-containing vapor phase is normally withdrawn as a vent gas stream. Another part of the hydrogen-containing vapor phase is normally recycled to the reactor system. The liquid hydrocarbon phase is withdrawn from the high pressure separator and typically sent to a low pressure separator which is maintained normally at a pressure in the range of from 100 p.s.i.g. to 200 p.s.i.g. A substantial amount of dissolved gaseous vapor, comprising hydrogen and normally gaseous contaminants such as ammonia and hydrogen sulfide, is released from the hydrocarbon liquid due to the pressure reduction of the low pressure separator and is recovered for use as a fuel or for further processing.

The hydrocarbon phase is then withdrawn and introduced into a fractionation zone in order to remove the substantial amount of gas which still remains dissolved therein due to the elevated pressure of the low pressure separator, and in order to effect the desired specifications on the treated hydrocarbon product or products. The dissolved gas comprises, hydrogen, methane, ethane, and other combustible products including propane and butanes which may yield liquefied petroleum gas. The fractionation is, therefore, normally undertaken in a manner sufficient to provide that the gas may be injected directly into the fuel gas system of the refinery or into a subsequent processing unit for the recovery of liquefied petroleum gas (LPG). Similarly, since the concentration of hydrogen sulfide in the gas is typically high, it is often the art to process such gas to recover elemental sulfur as a desired refinery product.

Since the gas which is to be recovered from the prior art fractionation zone must be passed into a fuel gas header or to subsequent processing units, it is desirable to recover the gas at elevated pressure. However, fractionation at elevated pressure is undesirable since the elevated pressure results in the elevation of the hydrocarbon boiling points with the result that substantial thermal cracking of the heavier hydrocarbon constituents results. This nonselective cracking is undesirable even though the processing unit may be a hydrocracking unit. Since the cracking occurs in an atmosphere devoid of hydrogen, substantial deposition of coke and amorphous hydrocarbonaceous material will occur on the surface of reboilers, heat exchangers, and column internals. In addition, the nonselective cracking will often result in product degradation sufficient to make it impossible to produce final product fractions which can meet specifications. Thus, where a kerosene cut is produced for use as a luminant, cracking within the fractionator may result in darkening of the kerosene thereby causing difficulty in meeting the color specification. Similarly, many lubricating oils must meet a color specification and are often discolored by fractionation at elevated temperatures.

In order to avoid the nonselective cracking of heavier hydrocarbons it is, therefore, the art to operate the subsequent distillation zone under vacuum or at substantially atmospheric pressure or at slightly elevated pressures which are sufficiently low to assure that the temperature of the distillation means will be below the thermal cracking limit of the hydrocarbons. Since the hydrocarbon leaving the low pressure separator contains a considerable quantity of dissolved gas, operation of the subsequent distillation means at slightly elevated pressure or at substantially atmospheric pressure or under vacuum necessitates increased column diameters and vapor line diameters due to the increased volume which the gas will occupy at reduced pressure. Since the dissolved gas must now be recovered at a low pressure, vacuum pumps and/or compressors are necessary in order that the gas may be raised in pressure for injection into the fuel gas system or for delivery to a sulfur recovery unit or to an LPG recovery unit. Since the recovered gas contains traces of moisture, traces of hydrogen chloride, and substantial amounts of hydrogen sulfide, the required vacuum pumps and compressors must be manufactured of corrosion resistant alloys. Experience has shown that despite the alloy construction of such compression equipment, under some conditions of service excessive maintenance is still required to keep the compression equipment in operation. Thus, while distillation of hydrogen treated or hydrocracking products under relatively low pressure or under reduced pressure will eliminate the danger of nonselective cracking of hydrocarbons, the prior art fractionation system has the disadvantage of requiring excessive capital and operating expense.

SUMMARY OF INVENTION

It is, therefore, an object of the present invention to provide a means of separation of a reactor effluent containing vapor, liquid, and normally gaseous contaminants. It is a particular broad object of the present invention to provide a means of separating said effluent wherein a part of the normally gaseous contaminants may form inorganic salts which are insoluble in the liquid phase of the effluent. It is a further object of the present invention to provide a means of separating a reactor effluent containing hydrogen, hydrocarbon, and normally gaseous contaminants in a manner sufficient to provide that the normally gaseous contaminants may be recovered without the use of compressor means while simultaneously affording a means for removal of the hydrocarbon insoluble salts. It is a particular object of the present invention to afford a means for separation of the reactor effluent from a hydrotreating or a hydrocracking reaction zone in a more facile and economical manner.

Therefore, in accordance with the practice of the present invention a broad embodiment may be characterized as a process for the separation of a reactor effluent containing vapor, liquid, and normally gaseous contaminants which comprises passing the effluent from a reaction zone into a first separation zone maintained under separation conditions; withdrawing from the first separation zone a first vapor stream containing a first part of the normally gaseous contaminants, and a first liquid stream containing a second part of the normally gaseous contaminants; passing the first vapor stream in admixture with a first aqueous stream specified into a second separation zone maintained under separation conditions; withdrawing from the second separation zone a second vapor stream, a second aqueous stream containing at least a portion of the first part of the normally gaseous contaminants, and a second liquid stream containing a second part of normally gaseous contaminants; passing the first liquid stream and the second liquid stream into a stripping zone maintained under stripping conditions; introducing stripping steam into the stripping zone; passing a third vapor stream comprising steam, vaporized liquid, and normally gaseous contaminants from the stripping zone into a third separation zone maintained under separation conditions; withdrawing from the third separation zone a stream comprising normally gaseous contaminants; withdrawing at least a part of the first aqueous stream specified from the third separation zone; and withdrawing from the stripping zone at least a third liquid stream having substantial freedom from normally gaseous contaminants.

Additionally, in accordance with the practice of the present invention a further embodiment may be characterized as a process for the separation of a reactor effluent containing hydrogen, hydrocarbon, and normally gaseous contaminants which comprises passing the effluent from a reaction zone into a first separation zone maintained under separation conditions; withdrawing from the first separation zone a first vapor stream comprising hydrogen, hydrocarbons, and a first part of the normally gaseous contaminants, and a first liquid stream containing a second part of the normally gaseous contaminants, passing the first vapor stream in admixture with a first aqueous stream specified into a second separation zone maintained under separation conditions; withdrawing from the second separation zone, a second vapor stream comprising hydrogen, a second aqueous stream containing at least a portion of the first part of the normally gaseous contaminants, and a second liquid stream comprising hydrocarbons and a second part of normally gaseous contaminants; passing the first liquid stream and the second liquid stream into a stripping zone maintained under stripping conditions; introducing stripping steam into the stripping zone; passing a third vapor stream comprising steam, hydrocarbon, and normally gaseous contaminants from the stripping zone into a third separation zone maintained under separation conditions; withdrawing from the third separation zone a stream containing normally gaseous contaminants; withdrawing at least a part of the first aqueous stream specified from the third separation zone; and withdrawing from the stripping zone at least a third liquid stream comprising hydrocarbon having substantial freedom from the normally gaseous contaminants.

In a more particularly preferred means of separation, the process of the above embodiments is further characterized wherein the stripping zone comprises a fractionating column wherein the second liquid fraction is introduced at an upper locus and the first liquid fraction is introduced at a locus below.

These and other more particularly preferred embodiments of the present invention may be more clearly understood by reference to the accompanying FIGURE 1 which consists of a schematic flow diagram illustrating one preferred embodiment thereof.

DRAWING AND EXAMPLE

In the particular embodiment disclosed in the accompanying drawing, a hydrocracking unit was designed to process ten thousand barrels per stream day (b.p.s.d.) of vacuum residuum having substantially the properties indicated in Table I below. The hydrocracking reaction zone was maintained under conditions sufficient to convert about 80% by weight of the fresh feed into products recoverable by distillation in the unit fractionation facilities. This fresh charge stock having a gravity of 8.8° API had an initial boiling point of 690° F. and an end point in excess of 1200° F. The operating conditions within the reaction zone comprised a hydrogen to hydrocarbon ratio of 5000 s.c.f.b., a liquid hourly space velocity of 0.5 on fresh feed, a liquid hourly space velocity of 1.0 on combined feed, and a reactor catalyst temperature of 875° F.

Table I.—Charge stock properties vacuum residuum

| | |
|---|---|
| Gravity, ° API @ 60° F. | 8.8 |
| Sulfur, wt. percent | 3.0 |
| Total nitrogen, wt. percent | 0.43 |
| Metals, p.p.m.: | |
|    Nickel | 35 |
|    Vanadium | 60 |
|    Iron, as combined iron | 15 |
| ASTM distillation, D1160, ° F.: | |
|    IBP | 690 |
|    2% over | 860 |
|    5% | 950 |
|    10% | 1,000 |
|    20% | 1,055 |

Referring now to the accompanying FIGURE 1, the reactor effluent from the above disclosed hydrocracking reaction zone enters the separation process of the subject invention by line 1 at a rate of 6169.0 moles per hour and at a pressure of 2535 p.s.i.g. and a temperature of 875° F. This reactor effluent containing hydrogen, hydrocarbon, and normally gaseous contaminants comprising hydrogen sulfide, ammonia, and traces of hydrogen chloride enters a cooler 2 wherein the temperature of the stream is reduced to 750° F. The cooled effluent then passes via line 3 into a hot separator 4 which is maintained at 2520 p.s.i.g. and 750° F. The effluent is separated therein into a hot vapor phase and a hot liquid phase. The hot vapor comprises 5066.0 moles per hour and leaves via line 6 at a temperature of 750° F. while the hot liquid comprising 1103.0 mols per hour (18,850 b.p.s.d.) leaves the hot separator 4 via line 5.

The hot vapor in line 6 comprising hydrogen, hydrocarbon, hydrogen sulfide, ammonia, and traces of hydrogen chloride passes via line 6 at 750° F. into a heat exchanger 7 wherein the temperature is reduced to 400° F. The resulting hot vapor effluent leaves heat exchanger 7 via line 8 and an aqueous stream comprising 648.0 moles per hour of water enters line 8 at 120° F. wherein it is mixed with the hot vapor effluent. The combined stream then passes into a condenser 9 and upon cooling to 120° F. is passed into a cold separator 11 via line 10. The cold separator 11 is maintained at 120° F. and a pressure of 2485 p.s.ig. A hydrogen-rich vapor phase leaves the cold separator 11 via line 12 at the rate of 4752.7 moles per hour. This hydrogen-rich stream contains hydrocarbon vapors as well as 183.2 moles per hour of hydrogen sulfide. Upon subsequent purification, this hydrogen-rich stream is returned in part to the hydrocracking reaction zone, not shown.

The liquid phase within the cold separator 11 is further divided into two parts. An aqueous stream leaves the cold separator 11 via line 13 and is sent to a disposal system, not shown. This aqueous stream amounts to 663.2 moles per hour and contains substantially all of the ammonia which entered the system via line 1. This portion of normally gaseous contaminants comprising ammonia and traces of hydrogen sulfide is thus removed from the system.

A cold hydrocarbon liquid at a temperature of 120° F. leaves the cold separator 11 via line 14 at the rate of 298.1 moles per hour. This cold hydrocarbon liquid contains 47.4 moles per hour of hydrogen sulfide and is sent to the upper section of stripping column 15 via line 14 at a temperature of 115° F. The cold hydrocarbon liquid is stripped with steam and light hydrocarbon vapor at the top of stripping column 15, and the resulting vapor stream leaves the column via line 16 at 325 p.s.i.g. and 370° F. The vapor stream in line 16 comprises 374.5 moles per hour of hydrocarbon, hydrogen, and hydrogen sulfide, as well as 375.0 moles per hour of steam. This vapor stream enters condenser 17 wherein it is cooled to 120° F. before passing via line 18 into separator 19. Separator 19 is maintained at 315 p.s.i.g. and 120° F. and liquid and vapor phases are separated therein. A vapor phase leaves separator 19 via line 20 comprising 367.1 moles per hour of hydrogen, hydrocarbon, and hydrogen sulfide. This vapor stream is sent to further processing units, not shown, wherein liquefied petroleum gas may be recovered, elemental sulfur may be recovered, and a part of the hydrogen may be recovered. The balance of the vapor stream is then sent to a fuel gas system for consumption elsewhere in the refinery. A hydrocarbon liquid comprising 7.4 moles per hour of light hydrocarbon with a trace of hydrogen sulfide, leaves the separator 19 via line 21 and is sent to the LPG recovery system, not shown.

The steam which has been condensed from the vapor leaving the stripper column 15 settles at the bottom of separator 19 and is sent via line 22 at a rate of 375.0 moles per hour to line 8. In addition, fresh steam condensate comprising 273 moles per hour in injected into line 22 via line 30 to yield the required 648.0 moles per hour of aqueous stream entering line 8, as noted hereinabove.

As previously noted, a hot hydrocarbon liquid leaves hot separator 4 via line 5 at 1103.0 moles per hour. This hot liquid is separated into two parts. The first part comprising 584.1 moles per hour, or 10,000 b.p.s.d., continues in line 5 as a recycle liquid which is returned to the reaction zone in order to be combined with the fresh feed for passage across the hydrocracking catalyst bed. The second part of the hot separator liquid comprising 518.9 moles per hour or 8,850 b.p.s.d., leaves line 5 via line 23 and enters a heat exchanger means 24. The cooling medium within heat exchanger 24 will be discussed hereinbelow. The hot liquid leaves heat exchanger 24 via line 25 after cooling to a temperature of 650° F. The hot liquid then enters stripping column 15 from line 25 at a locus below the entry point of the cold liquid which entered via line 14. The hot liquid is contacted with stripping steam in the lower zone of the stripping column 15 as more fully discussed hereinbelow.

The stripping steam enters the process of the present invention as condensate via line 26 at 100° F. at a rate of 433.0 moles per hour. The steam condensate enters heat exchanger 24 wherein it is generated into steam by cooling the hot separator liquid as previously noted hereinabove. The steam leaves exchanger 24 via line 27 at a rate of 433.0 moles per hour at a temperature of 435° F. and at a pressure of 335 p.s.i.g. The steam enters the stripping column 15 via line 27 wherein it passes upwardly to strip light components out of the heavy hydrocarbon.

The stripping column 15 provides two hydrocarbon streams which have been rendered substantially free of normally gaseous contaminants by the stripping steam. A side-cut is removed via line 28 at a temperature of 540° F. This side-cut comprises 227.0 moles per hour of hydrocarbon and 26.0 moles per hour of water. The hydrocarbon stream of line 28 contains about 3.8 moles percent of pentane and lighter constituents, and has a boiling range of from about 150° F. to about 800° F. The heavy ends of the hydrocracked hydrocarbon effluent are removed from the bottom of stripping tower 15 via line 29 at a temperature of 610° F. The heavy ends comprise 215.5 moles per hour of hydrocarbon and 32.0 moles per hour of water. This heavy fraction which leaves stripper column 15 via line 29 is substantially free of pentane and lighter constituents, and has a boiling range of from about 350° F. to about 1150° F.

The side-cut fraction removed via line 28 is sent to a subsequent fractionation column, not shown, which operates at about 15 p.s.i.g. Desired products comprising a naphtha fraction, a kerosene fraction, and a gas oil fraction are produced from the subsequent fractionating column. The bottoms fraction removed via line 29 is passed to a vacuum tower, not shown. The vacuum tower produces a light vacuum gas oil, a heavy vacuum gas oil and an asphalt fraction.

The effectiveness of the inventive separation process as disclosed in the preceding example may be more readily ascertained by now referring to the accompanying Table II wherein component distributions are indicated for the subject separation process discussed hereinabove. It will be noted, in particular, that the products produced in lines 28 and 29 have been rendered substantially free of the normally gaseous contaminants comprising ammonia and hydrogen sulfide. Consequently, it is possible to fractionate the stripper side-cut at substantially atmospheric pressure in the subsequent fractionation column to produce the desired cut of naphtha, kerosene, and gas oil. Since the normally gaseous contaminants have been removed by the stripping column 15, the vent gas removed may be compressed and sent to the LPG recovery unit without danger of corrosion in the compressor means. In addition, it will be seen in Table II that the product resulting via line 29 is substantially free of hexane and light hyrdocarbon constituents. Accordingly, when this fraction is subsequently separated in the vacuum tower to produce the light vacuum gas oil, heavy vacuum gas oil, and asphalt, there will be substantially no loss of hydrocarbon constituents to the vacuum system.

TABLE II.—HYDROCRACKED EFFLUENT SEPARATION STREAM COMPONENT DISTRIBUTION, MOLES/HR.

| | Total reactor effluent | Recycle hot separator liquid | Net hot separator liquid | Hot separator vapor | Spent water to disposal | Net reactor effluent gas |
|---|---|---|---|---|---|---|
| Drawing line number | 1 | 5 | 23 | 6 | 13 | 12 |
| Molecular components: | | | | | | |
| $H_2O$ | | | | | 646.2 | 1.8 |
| $NH_3$ | 17.0 | | | 17.0 | 17.0 | |
| $N_2$ | 31.0 | 1.0 | 1.0 | 29.0 | | 28.7 |
| $H_2S$ | 247.0 | 16.3 | 13.7 | 217.0 | Trace | 183.2 |
| $H_2$ | 4175.0 | 181.0 | 160.0 | 3834.0 | | 3803.8 |
| $C_1$ | 594.0 | 28.6 | 26.4 | 539.0 | | 521.5 |
| $C_2$ | 129.0 | 11.2 | 9.8 | 108.0 | | 97.0 |
| $C_3$ | 110.0 | 8.5 | 8.5 | 93.0 | | 72.0 |
| $i-C_4$ | 21.0 | 2.1 | 1.9 | 17.0 | | 10.6 |
| $n-C_4$ | 47.0 | 4.7 | 4.3 | 38.0 | | 21.0 |
| $i-C_5$ | 16.0 | 2.3 | 1.7 | 12.0 | | 4.5 |
| $n-C_5$ | 15.0 | 2.3 | 1.7 | 11.0 | | 3.5 |
| $C_6$ | 32.0 | 4.8 | 4.2 | 23.0 | | 3.5 |
| Heavy fraction boiling range, °F.: | | | | | | |
| $C_7$–300° EP | 65.0 | 11.8 | 11.2 | 42.0 | | 1.4 |
| 300–400° EP | 51.0 | 11.9 | 11.1 | 28.0 | | 0.2 |
| 400–500° | 51.0 | 16.3 | 13.7 | 21.0 | | |
| 500–600° | 82.0 | 31.6 | 28.4 | 22.0 | | |
| 600–700° | 82.0 | 38.3 | 33.7 | 10.0 | | |
| 700–800° | 87.0 | 43.8 | 39.2 | 4.0 | | |
| 800–900° | 78.0 | 41.1 | 35.9 | 1.0 | | |
| 900–1,000° | 75.0 | 40.0 | 35.0 | | | |
| 1,000–1,100° | 68.0 | 35.7 | 32.3 | | | |
| 1,100–end point | 96.0 | 50.8 | 45.2 | | | |
| Total moles per hour | 6169.0 | 584.1 | 518.9 | 5066.0 | 663.2 | 4752.7 |
| Moles per hour of nonaqueous | 6169.0 | 584.1 | 518.9 | 5066.0 | 17.0 | 4750.9 |
| B.p.s.d. of liquid stream | | 10,000 | 8850 | | 810 | |
| Gravity of liquid stream, °API | | 22.5 | 22.5 | | | |

| | Cold separator liquid | Stripper overhead vapor | Net stripper off-gas | Net stripper overhead liquid | Stripper side-cut liquid | Stripper bottoms liquid |
|---|---|---|---|---|---|---|
| Drawing line number | 14 | 16 | 20 | 21 | 28 | 29 |
| Molecular components: | | | | | | |
| $H_2O$ | | 375.0 | Trace | | 26.0 | 32.0 |
| $NH_3$ | | | | | | |
| $N_2$ | 0.3 | 1.3 | 1.3 | | | |
| $H_2S$ | 33.8 | 47.4 | 46.8 | 0.6 | | |
| $H_2$ | 30.2 | 190.2 | 190.1 | 0.1 | | |
| $C_1$ | 17.5 | 43.9 | 43.8 | 0.1 | | |
| $C_2$ | 11.0 | 20.8 | 20.6 | 0.2 | | |
| $C_3$ | 21.0 | 28.9 | 28.2 | 0.7 | 0.6 | |
| $i-C_4$ | 6.4 | 7.5 | 7.1 | 0.4 | 0.8 | |
| $n-C_4$ | 17.0 | 18.4 | 17.2 | 1.2 | 2.9 | |
| $i-C_5$ | 7.5 | 6.2 | 5.4 | 0.8 | 3.0 | |
| $n-C_5$ | 7.5 | 5.9 | 5.0 | 0.9 | 3.3 | |
| $C_6$ | 19.5 | 1.8 | 1.2 | 0.6 | 21.6 | 0.3 |
| Heavy fraction boiling range, °F.: | | | | | | |
| $C_7$–300° EP | 40.6 | 1.4 | 0.4 | 1.0 | 49.1 | 1.3 |
| 300–400° EP | 27.8 | 0.5 | | 0.5 | 36.5 | 1.9 |
| 400–500° | 21.0 | 0.2 | | 0.2 | 30.9 | 3.6 |
| 500–600° | 22.0 | 0.1 | | 0.1 | 38.8 | 11.5 |
| 600–700° | 10.0 | | | | 23.4 | 20.3 |
| 700–800° | 4.0 | | | | 11.6 | 31.6 |
| 800–900° | 1.0 | | | | 3.8 | 33.1 |
| 900–1000° | | | | | 0.5 | 34.5 |
| 1000–1100° | | | | | 0.1 | 32.2 |
| 1100–end point | | | | | | 45.2 |
| Total moles per hour | 298.1 | 479.5 | 367.1 | 7.4 | 253.0 | 247.5 |
| Moles per hour of nonaqueous | 298.1 | 374.5 | 367.1 | 7.4 | 227.0 | 215.5 |
| B.p.s.d. of liquid stream | 2,600 | | | 56.0 | 3,267 | 7,060 |
| Gravity of liquid stream, °API | 59.1 | | | 80.0 | 39.6 | 14.3 |

One of the many advantages of the inventive process is that by passing the hot liquid from the hot separator via line 23 to the stripping zone, there is a substantial savings of utilities cost. The heat which is required at the stripping column is supplied by one of the incoming streams. In the particular embodiment of the specific example, the heat required for generating the stripping steam is also supplied by this incoming stream at exchanger 24.

It is also found that by charging the cold separator liquid and the hot separator liquid simultaneously to the same stripping column, there is a substantial saving of steam above what would be required if these two fractions were steam stripped in separate columns. The stripping steam which leaves the lower zone does a double duty since it also provides a means for stripping the lighter contaminants from the upper stripping zone. There is additional advantage in the inventive process in that this stripping steam, in great part, provides the required condensate stream which is necessary to wash the hydrocarbon insoluble salts from the condenser 9. This also provides a savings in utility cost.

It is particularly to be noted that the inventive process has the distinct advantage of providing that the corrosive vent gas leaving via line 20 is at an elevated pressure so that no compressor means is necessary. At the same time, this elevated pressure which is imposed upon the hydrocarbon separation in column 15 does not result in the hydrocarbon boiling point elevation which would normally result in thermal cracking. Sufficient stripping steam is provided to maintain the partial pressure of the hydrocarbon constituents low enough to provide that the hydrocarbon boiling points are maintained substantially below the point where detrimental thermal cracking may be encountered.

These and other advantages of the inventive process will be readily ascertained by those skilled in the art.

It must be realized that the operating conditions of pressure, temperature, and stripping steam rate, as well as the phase separations between liquid and vapor, are particular only to the specific example cited. Various modifications in operating conditions would be necessary in order to obtain any specifically desired separation on a reactor effluent which would be substantially the same or different from the reactor effluent disclosed in the example hereinabove.

Since the inventive separation process is particularly effective in separating the effluent from a hydrotreating reaction zone or a hydrocracking reaction zone, the hot separator 4 and the cold separator 11 will normally operate at substantially the same pressure as the preceding reaction zone. Similarly, the temperature level with the hot separator 4 will be substantially the same as the temperature of the preceding reaction zone. Typically, the hot separator 4 may be maintained at a pressure of from about 100 p.s.i.g. to 1500 p.s.i.g. and at a temperature of from about 350° to 900° F. when separating a hydrotreating reactor effluent, and hot separator 4 may typically operate at a pressure of from about 100 to 3000 p.s.i.g. and at a temperature from about 500 to 1000° F. when separating the effluent from a hydrocracking reaction zone. Cold separator 11 will normally be operated at substantially the same pressure level of from about 100 p.s.i.g. to 1500 p.s.i.g. for a hydrotreating reaction effluent, and at substantially the same pressure level of from about 100 p.s.i.g. to 3000 p.s.i.g. for a hydrocracking reaction effluent. However, the temperature level within cold separator 11 would, in either case, typically be in the range from about 60° F. to 200° F., but normally would be maintained at a level of from 100° F. to 150° F.

The operating conditions which may be necessary within stripping column 15 and its appended separator 19 need not be specifically designated since the component distribution of the reactor effluent will have a pronounced effect upon the operating conditions necessary to make any specifically desired separation. In the example given above, wherein a hydrocracked vacuum residuum was separated, the temperature of column 15 was from 370° F. to 650° F. The pressure within stripping column 15 was from 325 to 330 p.s.i.g. while 335 p.s.i.g. stripping steam was utilized. For a typical separation wherein the effluent charged to the inventive process comprises a hydrotreated straight-run deisel oil, stripping column 15 could be typically operated at a temperature of from about 300 to 350° F. and a pressure of from about 100 p.s.i.g. to 150 p.s.i.g., while a 150 p.s.i.g. stripping steam could be utilized. The specific operating conditions which would be required within stripping column 15 for the separation of any other specific hydrocarbon fractions are readily ascertainable by those skilled in the art from general knowledge and the teachings presented herein.

Since separator 19 is in direct communication with stripping column 15, the pressure within separator 19 will be substantially the same as that within stripping column 15. The temperature of separator 19, since it must separate liquid and vapor phases, may be maintained at from 60 to 200° F. but normally will be maintained at from 100 to 150° F.

In summary, therefore, specific separating conditions which will be utilized within the inventive separation process must depend upon a great many factors. Of primary consideration is the actual component distribution within the effluent leaving reaction zone as well as the specific separation or fractionation which is desired. The only limitation which is necessarily imposed upon the separation process is that the separating conditions should be adjusted in a manner sufficient to provide that there will be a minimum amount of thermal cracking or product degradation occurring within the separation process, and particularly within stripping column 15, while at the same time providing sufficient stripping to produce liquid hydrocarbon fractions having substantial freedom from the normally gaseous contaminants.

While substantially all of the stripping steam utilized in stripper 15 is reused as the condensate wash at condenser 9, an additional condensate fraction is required in order to provide that condenser 9 is washed with an adequate volume of water. As previously disclosed hereinabove, the volume of water required for washing the hydrocarbon insoluble salts out of condenser 9 is normally an excess of 3 vol. percent of the total reactor feed. While the subject example shows a fresh condensate stream coming into line 22 via line 30 to supply the deficiency of condensate volume, it is within the scope of the present invention to provide at least a part of this water deficiency by recycling a part of the aqueous phase removed via line 13 back to line 8 via line 31. While the aqueous phase of line 13 contains the hydrocarbon insoluble salts, it would be effective in adding to the aqueous stream of line 22 since aqueous stream 13 is not saturated with these salts.

Additionally, it will be noted that the steam condensate is generated into the required stripping steam of line 27 by exchange with the hot liquid of line 23 in exchanger 24. It is within the scope of the inventive process to generate this stripping steam by exchanging the steam condensate with other hot streams within the inventive process. Thus, exchanger 24 could generate the required steam by being placed in line 1, or in line 3, or in line 6, or in line 29, etc.

While the discussion and the example are particular to hydrotreating and hydrocracking of hydrocarbons, the inventive process is not to be construed as to be so limited. Thus, it is within the scope of the present invention to separate effluent mixtures wherein the vapor may not comprise hydrogen but may comprise some other specified vapor or gas, the liquid may not comprise hydrocarbons but may comprise hydrophobic organic chemicals, salts may be produced which are insoluble in the organic chemicals, and/or gaseous contaminants must be removed which may or may not comprise ammonia or hydrogen sulfide. Typical of other vapor or gas constituents which may be found in the product effluent from other chemical reaction zones are helium, nitrogen, carbon dioxide, carbon monoxide, methane, ethane, etc. Typical of other gaseous contaminants which may be removed from hydrophobic organic chemical effluents are vapors such as hydrogen chloride, boron trifluoride, iodine, fluorine, sulfur dioxide, nitric acid, etc.

PREFERRED EMBODIMENT

From the foregoing disclosure, the preferred embodiment of the inventive process may be summarized as a process for the separation of a reactor effluent containing hydrogen, hydrocarbon, and normally gaseous contaminants which comprises, passing the effluent from a reaction zone into a hot separator maintained under separation conditions; withdrawing from the hot separator a first vapor stream comprising hydrogen, hydrocarbons, and a first part of the normally gaseous contaminants and a first liquid stream containing a second part of the normally gaseous contaminants; passing the first vapor stream in admixture with a first aqueous stream, into a cold separator maintained under separation conditions; withdrawing from the cold separator a second vapor stream comprising hydrogen, a second aqueous stream containing at least a portion of the first part of the normally gaseous contaminants, and a second liquid stream comprising hydrocarbons and a second portion of the first part of normally gaseous contaminants; passing the second liquid stream to the upper section of a stripping column maintained under separation conditions; passing the first liquid stream into a heat exchanger means and thereafter into said stripping column at a locus below the upper section; generating steam in the heat exchanger means and passing the steam into the stripping column; passing a third vapor stream comprising steam, hydrocarbon, and normally gaseous contaminants from the stripping column into a phase separator maintained at separation conditions; withdrawing from said phase separator a stream containing normally gaseous contaminants; withdrawing at least a part of the first aqueous stream specified from the phase separator; and withdrawing from the stripping column, at least a third liquid stream comprising hydrocarbons having substantial freedom from normally gaseous contaminants.

The invention claimed is:

1. Process for the separation of a reactor effluent containing a vapor constituent, liquid, and normally gaseous contaminants which comprises:
   (a) passing said effluent from a reaction zone into a first separation zone maintained under separation conditions;
   (b) withdrawing from said first separation zone a first vapor stream comprising vapor constituent, vaporized liquid, and a first part of said normally gaseous contaminants;
   (c) withdrawing from said first separation zone a first liquid stream containing a second part of said normally gaseous contaminants;
   (d) passing said first vapor stream in admixture with a first aqueous stream specified into a second separation zone maintained under separation conditions;
   (e) withdrawing from said second separation zone a second vapor stream comprising vapor constituent, a second aqueous stream containing at least a portion of said first part of the normally gaseous contaminants, and a second liquid stream containing a second portion of said first part of normally gaseous contaminants;
   (f) passing said first liquid stream and said second liquid stream into a stripping zone maintained under stripping conditions;
   (g) introducing stripping steam into said stripping zone;
   (h) withdrawing from said stripping zone, at least a third liquid stream having substantial freedom from said normally gaseous contaminants;
   (i) passing a third vapor stream comprising steam and normally gaseous contaminants from said stripping zone into a third separation zone maintained at separation conditions;
   (j) withdrawing from said third separation zone a stream containing normally gaseous contaminants; and
   (k) withdrawing at least a part of said first aqueous stream specified from said third separation zone.

2. Process of claim 1 wherein said stripping zone comprises a fractionation column wherein said second liquid stream is introduced at an upper locus and said first liquid stream is introduced at a locus below.

3. Process of claim 2 wherein said third liquid stream is removed from the bottom of said fractionation column and a fourth liquid stream having substantial freedom from said normally gaseous contaminants is withdrawn as a side-cut from said column.

4. Process of claim 1 wherein a part of said second aqueous stream is passed in admixture with said first vapor stream and said first aqueous stream into said second separation zone.

5. Process for the separation of a reactor effluent containing hydrogen, hydrocarbon, and normally gaseous contaminants which comprises;
   (a) passing said effluent from a reaction zone into a first separation zone maintained under separation conditions;
   (b) withdrawing from said first separation zone a first vapor stream comprising hydrogen, hydrocarbon, and a first part of said normally gaseous contaminants;
   (c) withdrawing from said first separation zone a first liquid stream comprising hydrocarbons and a second part of normally gaseous contaminants;
   (d) passing said first vapor stream in admixture with a first aqueous stream specified, into a second separation zone maintained under separation conditions;
   (e) withdrawing from said second separation zone a second vapor stream comprising hydrogen, a second aqueous stream containing at least a portion of said first part of the normally gaseous contaminants, and a second liquid stream comprising hydrocarbons and a second portion of said first part of normally gaseous contaminants;
   (f) passing said first liquid stream and said second liquid stream into a stripping zone maintained under stripping conditions;
   (g) introducing stripping steam into said stripping zone;
   (h) withdrawing from said stripping zone, at least a third liquid stream comprising hydrocarbon having substantial freedom from said normally gaseous contaminants;
   (i) passing a third vapor stream comprising steam, and normally gaseous contaminants from said stripping zone into a third separation zone maintained at separation conditions;
   (j) withdrawing from said third separation zone, a stream containing normally gaseous contaminants; and
   (k) withdrawing at least a part of said first aqueous stream specified from said third separation zone.

6. Process of claim 5 wherein said reaction zone comprises either a hydrocracking reaction zone or a hydrotreating reaction zone.

7. Process of claim 5 wherein said stripping zone comprises a fractionation column wherein said second liquid stream is introduced at an upper locus and said first liquid stream is introduced at a locus below.

8. Process of claim 7 wherein said third liquid stream is removed from the bottom of said fractionation column and a fourth liquid stream comprising hydrocarbon having substantial freedom from said normally gaseous contaminants is withdrawn as a side-cut from said column.

9. Process of claim 5 wherein a part of said second aqueous stream is passed in admixture with said first vapor stream and said first aqueous stream into said second separation zone.

10. Process of claim 5 wherein said third vapor stream of step (i) and said stream of step (j) contain hydrocarbons comprising propane and butanes.

References Cited

UNITED STATES PATENTS

| | | | |
|---|---|---|---|
| 2,500,329 | 3/1950 | Steitz | 208—83 |
| 3,326,781 | 6/1967 | Wilson | 208—83 |

HERBERT LEVINE, *Primary Examiner.*

U.S. Cl. X.R.

62—27; 203—39, 96; 208—340, 363, 368